United States Patent [19]

Rattazzini

[11] Patent Number: 4,766,703
[45] Date of Patent: Aug. 30, 1988

[54] ADJUSTABLE SUPPORT REST FOR A CYLINDER GRINDING MACHINES OR THE LIKE

[75] Inventor: Paolo Rattazzini, Alpignano, Italy

[73] Assignee: Giustina International S.P.A., Torino, Italy

[21] Appl. No.: 28,482

[22] Filed: Mar. 20, 1987

[30] Foreign Application Priority Data

Apr. 4, 1986 [IT] Italy ................. 19982 A/86

[51] Int. Cl.$^4$ .............................................. B24B 1/00
[52] U.S. Cl. ................................ 51/289 R; 51/238 R; 51/238 S
[58] Field of Search ............. 51/236, 232, 233, 238 R, 51/238 S, 289 R, 49, 50 R, 105 R, 105 SP; 269/58, 71, 309

[56] References Cited

U.S. PATENT DOCUMENTS 3,398,489  9/1987  Rohrer ................................ 51/49

Primary Examiner—Frederick R. Schmidt
Assistant Examiner—Lawrence Cruz
Attorney, Agent, or Firm—Herbert Dubno

[57] ABSTRACT

A motorized rest for supporting the piece being worked by grinding machines for cylinders, rollers and the like, has a fixed lower body suitable for being joined to a bench of the grinding machine, on which an upper body is slidingly arranged so as to be movable transverse to the axis of rotation of the piece, provided with two or more sliding blocks for support of the piece itself in an area not subjected to working, connected to the fixed lower body by a connecting rod having an axis parallel to the envisaged relative direction of sliding of the bodies of the rest. The connecting rod is joined to the fixed body by a support pin consisting of an eccentric shaft which can be operated in rotation by a servomotor provided with a speed reduction gear with high reduction ratio. A flexible element is interposed between lower body and upper body for compensation of play.

5 Claims, 4 Drawing Sheets

ADJUSTABLE SUPPORT REST FOR A CYLINDER GRINDING MACHINES OR THE LIKE

FIELD OF THE INVENTION

The present invention relates to a motorized rest for supporting the piece being worked by grinding machines for cylinders, rollers and the like, provided with means for controlling the movement of workpiece with precision.

BACKGROUND OF THE INVENTION

The grinding of cylinders and the like of considerable weight, such as for example the cylindrical rolls of a rolling mill, on a grinding machine, with maximum precision requires that the cylinder itself be held on the machine in a rotating manner, with its axis parallel to the traversing direction of the grinding tool.

In general, with the aim of having perfect coaxiality between the parts of the roll used for mounting the roll in the machine for which it is intended, such as for example a rolling mill, and the cylindrical surface to be ground, the support of the cylinder at its ends is realized by means of supporting and sliding devices, known as rests, joined to a fixed bench of the grinding machine and provided with sliding blocks, on which the mounting areas of the supports bear.

In the high-precision grinding of the surface of cylinders it is particularly important to maintain parallelism between the axis of rotation of the cylinder being worked and the direction of displacement of the tool used. In fact, an error in the parallelism leads to a conicity of the piece worked, because it sets the tool at different distances from the axis of the cylinder along its longitudinal extent and therefore such possible errors have to be compensated as soon as a conicity begins to occur during the course of machining, by a corresponding displacement of the axis of the cylinder being worked, until the optimum geometrical conditions are restored.

In the case of the known rests, fine adjustment of the position of the cylinder axis, with the aim of obtaining the parallelism desired, is achieved by manually moving the upper sliding block or possibly, in automatic machines, by motorized movement of the sliding block by means of a rocking device.

However, such structures present a number of problems attributable to the lack of rigidity of the assembly, which causes difficulty in attaining the degree of machining precision desired, and attributable to the fact that, owing to the slope of the lower sliding block with respect to the horizontal, due to the necessity of providing sufficiently stable support for the cylinder, the movement of the upper sliding block results in an upward and downward movement of the axis of the cylinder, slightly altering the geometry of the piece ground or requiring a final compensation.

OBJECT OF THE INVENTION

The object of the invention, therefore, is to provide a rest for supporting the cylinders on grinding machines which is capable of allowing a microadjustment of the position of the cylinder axis with absolute and linear control of the movement, which can be effected by means of an electronic feedback system.

SUMMARY OF THE INVENTION

This object is attained by the present invention, which provides a motorized rest for supporting the piece being worked by a grinding machine for cylinders, rolls and the like, which consists of a fixed lower body which can be joined to a bench of the grinding machine. On this lower body, an upper body is slidingly arranged so as to be movable transverse to the axis of rotation of the piece.

The upper body is provided with two or more sliding blocks for support of the workpiece by regions thereof not subjected to working. The sliding blocks are connected to the fixed lower body by means of a connecting rod having an axis parallel to the direction of sliding of the bodies of the rest. The connecting rod is joined to the fixed body by means of a support pin consisting of an eccentric shaft which can be rotated by a servomotor provided with a speed reduction gear with high reduction ratio.

Flexible means is interposed between the lower body and upper body for compensation of the play. Lubricating devices are provided for the respective sliding surfaces of the lower body and of the upper body and controllable clamping means grip between them by friction the respective sliding surfaces of the lower body and of the upper body.

The flexible means for compensation of play conveniently consists of two or more small columns borne by the moving upper body, on which there are support spring means acting in a direction parallel to the axis of the connecting rod for maintaining the connecting rod and the respective pins in a state of flexible axial stress, such as to eliminate any play.

The lubricating devices comprise hydrostatic means for support of the upper body on the lower body, suitable for allowing, when operated, the relative movement of said bodies with reduced friction and without lag.

The means for controllable clamping conveniently consists of a hydromechanical actuator borne by the lower body of the rest and having its own movable part connected to the upper body, with its operating axis perpendicular to the respective sliding surfaces of the bodies of the rest.

More particularly, the hydromechanical actuators can comprise toggle joints for operation of its movable rod, suitable for maintaining the clamping position of the actuator even in the absence of operating fluid.

In a preferred embodiment of the invention, the upper body of the rest takes the form of a structure having different vibrational characteristics from those of the structure comprising the fixed lower body.

BRIEF DESCRIPTION OF THE DRAWING

The invention will be described in more detail below with reference to the attached drawings, in which.

SPECIFIC DESCRIPTION

Figure 1:
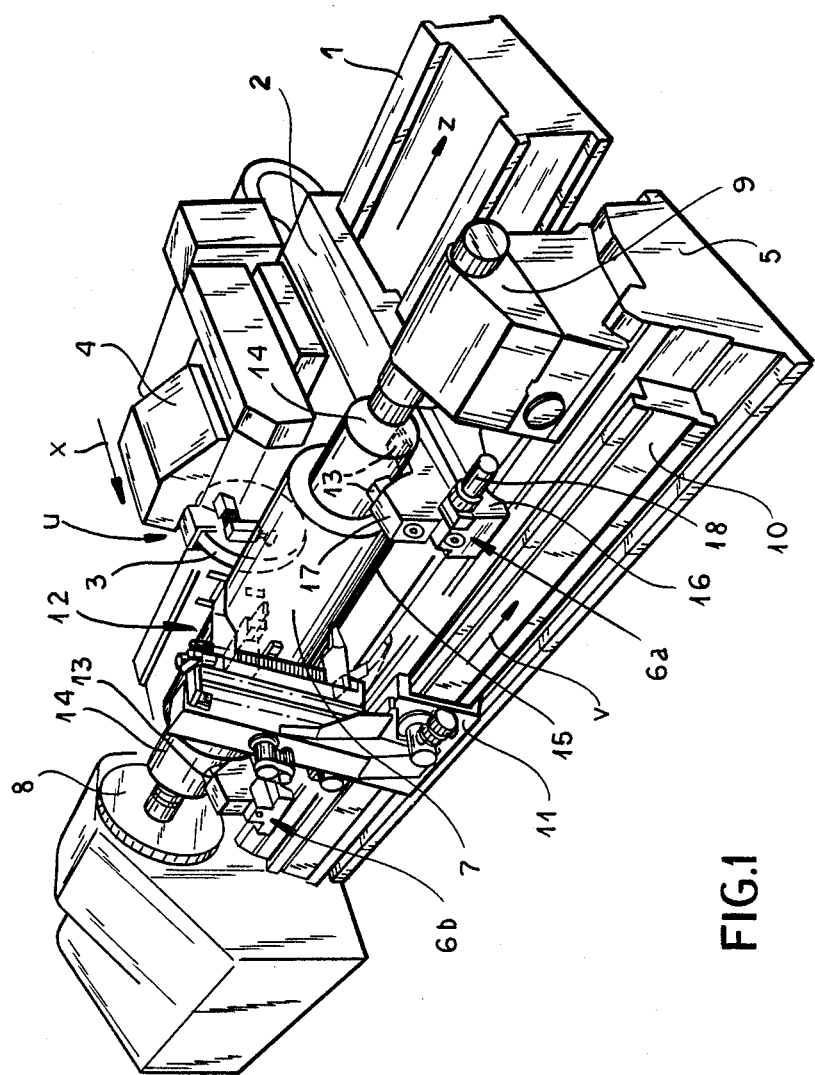
FIG. 1 shows a general perspective view of a grinder provided with the movable rest according to the invention.
Figure 2:
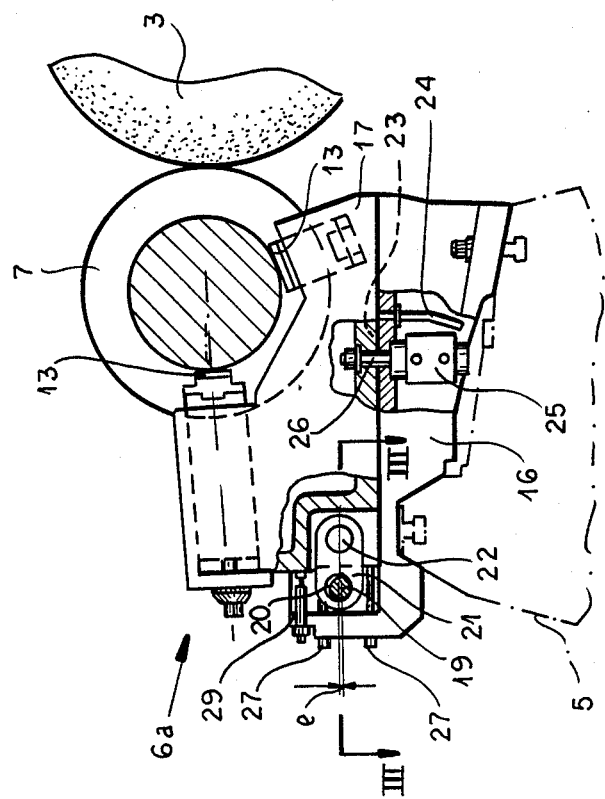
FIG. 2 shows the rest in side view, partially in section.

As FIG. 1 shows, a grinding machine for cylinders comprises a rear bench 1, on which the main carriage 2 is mounted to slide along the axis Z and to carry the tool 3 which is a grinding wheel. The carriage 2 is provided with motorized devices suitable for traversing the carriage along the rear bench 1 over the entire working length envisage.

The wheel 3 is rotatably supported and driven by the respective bearing and powering devices 4, and can be moved on the carriage 2 along the axis X, perpendicular to the axis Z and lowered in the direction of arrow U, for advance of the tool toward the workpiece.

In parallel to the rear bench 1, there is also a front bench 5, on which are located the rests 6a, 6b for supporting the cylinder or roll 7, as well as a workhead 8 and a counterhead 9, having the devices for setting the cylinder in rotation and for blocking the same in the longitudinal direction.

In the example of the grinding machine illustrated, also fixed to the front bench 5 is a third bench 10, on which a measuring carriage 11 can travel, movable along the axis V, parallel to the axis Z and the axis of the roll 7, carrying a gauge 12 and further measuring devices.

Two rests 6a, 6b are provided with sliding blocks 13, on which the two end stubs 14 of the cylinder 7 are supported with geometrical precision. These stubs 14 can be the portions on which the support bearings of the roll are mounted in the rolling mill mounted. This makes it possible to have perfect coaxiality between these areas and the cylindrical surface 15 to be ground.

In order to obtain a complete alignment of the cylinder with respect to the generatrix along which the grinder operates, determined by the trajectory followed by the tool 3 in contact with the cylinder, the rest consists of two bodies, one a lower element 16, joined to the bench 5, and the other an upper element 17 which can travel on the lower element 16 on which it is slidingly supported.

Such a possibility of adjustment makes it possible to achieve the alignment of the cylinder on the machine; the lack of parallelism between the axis of rotation of the cylinder the axis of traversing of the wheel would in fact result in an impermissible conicity of the cylinder after working.

During working, the measuring instruments provided on the machine, comprising the gauge 12 and/or other measuring devices, provide an indication of the profile obtained for the roller and, if there should be any conicity, they command the intervention of automatic means for correction which initiates a variation in the position of the rest 6a, moving it toward or away from the grinding tool until the form required is obtained with the desired degree of precision. To such an end, the rest 6a is provided with a servomotor 18 which, as FIG. 3 also shows, controls a shaft 19 having an eccentric portion 20, with eccentricity "e", which bears a connecting link 21 joined by pin 22 with the upper body 17 of the rest.

Figure 3:
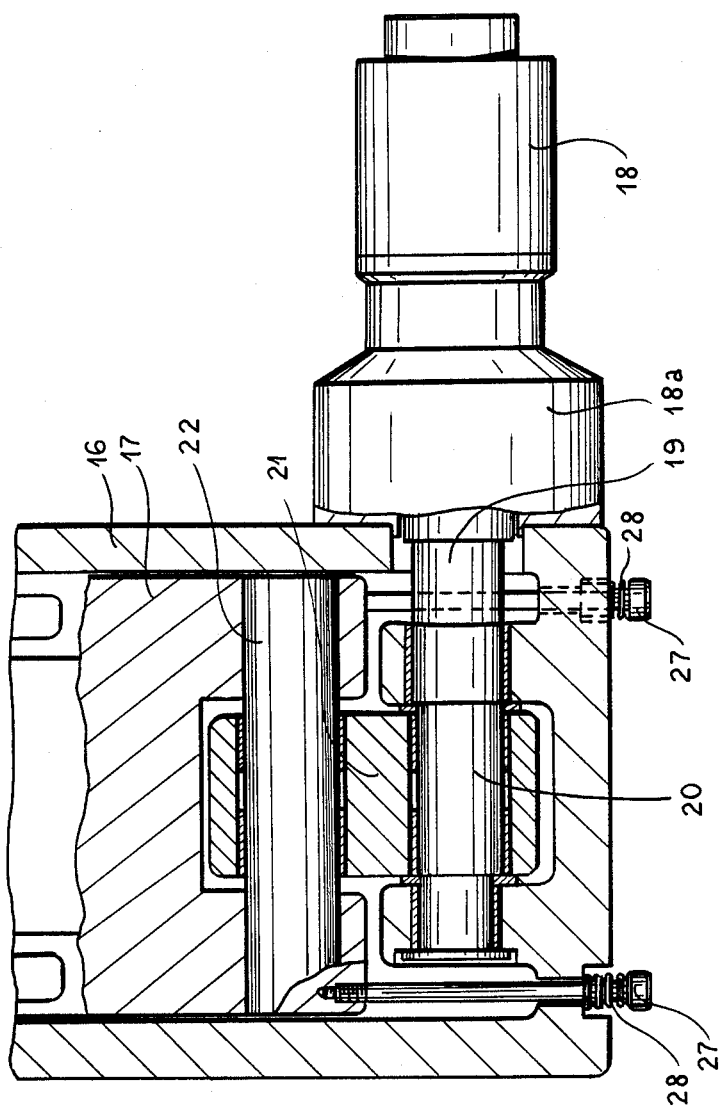
FIG. 3 shows the section according to the plane III—III of FIG. 2.

The upper body 17 of the rest is supported on the upper surface of the lower body 16 and has hydrostatic supporting pockets 23, fed by means of pipes 24 with pressurized oil, suitable for allowing the movement of the body 17 on the body 16 with reduced friction, and there is also a hydromechanical actuator 25 joined to the lower body 17 and acting with a movable rod 26 on the body 17, suitable for cutting, on command, the fixed angle between the body 16 and 17 of the rest during working. The servomotor 18 comprises a two-stage reduction gear 18a, with very high reduction ratio (for example 1/18,000), by which the shaft 19, provided with the eccentric portion 20, illustrated in FIG. 3, is displaced; the upper body 17 of the rest also is connected to the lower body by means of two pairs of small columns 27, provided with springs 28 suitable for providing a stressing of the upper body 17 with respect to the lower body 16, which eliminates any play there may be between the eccentric 20, the connecting link 21 and the tie rod 22.

The hydromechanical actuator 25 is conveniently of a jointed type, suitable for remaining nevertheless in a locked position in the absence of feed pressure, also offering a multiplication of the stress realized, for maximum rigidity of the blockage. A linear transducer 29, borne by the lower body 16 of the rest and connected to its upper body 17 allows the relative position of the two parts to be traced. With the aim of obtaining the maximum stability in supporting the cylinder being worked, the fixed body 16 of the rest is conveniently made of electro-welded sheet steel, while the movable upper body 17 of the rest is a cast element. This ensures different vibrational characteristics being achieved for the two parts, avoiding or reducing greatly the possibility of transmission of vibration, which could impair working precision.

Figure 4:
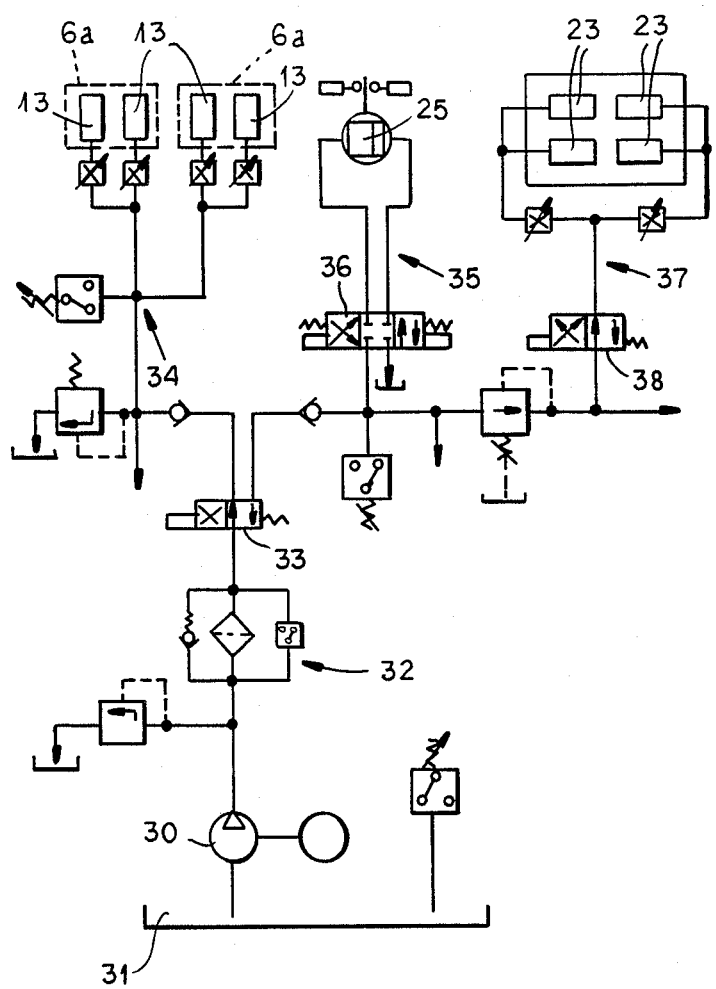
FIG. 4 is a hydraulic diagram of the supporting and blocking apparatus of the rest.

The hydraulic diagram of the apparatus for operating the rest is shown in FIG. 4: it comprises a pump 30, drawing from a tank 31, which feeds, via a filter 32 and an automatic distribution valve 33, the lubrication circuit 34 of the sliding blocks 13 of the rests 6a, 6b, or else, with the valve 33 in a different position, the circuit 35 for operation of the actuator 25 for blocking the rest, controlled by the valve 36, and the circuit 37 for feeding the hydrostatic pockets 23 for supporting the rest during the phase in which its position is adjusted, by means of the valve 38.

In the phase of normal working, the actuator 25 is blocked and the rest is in its state of maximum rigidity; in this state, the feeding of the actuator 25 and the hydraulic support by means of the pockets 23 are eliminated by means of the valve 33 and the lubrication system of the sliding blocks 13 is fed.

If the measuring systems of the grinding machine detect a position error tending toward conicity of the roll 7 being machined, the motorized rest 6a is operated to correct the disposition of the cylinder by a certain amount toward the wheel 3 or in the opposite direction. To achieve such an aim, the valve 33 is used to feed the hydraulic movement circuit, initiating by means of the valve 38 the unblocking of the actuator 25 and freeing the upper body 17 of the rest, and at the same time feeding the support pockets 23, by means of the circuit 37, for the purpose of achieving uniform sliding without any lag.

The servomotor 18 is therefore actuated, by means of the coaxial reduction gear 18a, makes the eccentric 20 rotate within its hole in the connecting rod 21, thus determining the movement of the body 17 in the direction desired, carrying the cylinder supported by the connecting rod in correct alignment.

The operation of the servomotor 18 is monitored by means of the linear transducer 29, associated with an electronic feed back control circuit, which checks the magnitude of the movement executed, controlling the motor until the specified value is reached.

With the aim of achieving good linearity of the movement executed, the maximum rotation allowed for the eccentric is ±10°.

Once the new position of the rest and of the axis of rotation of the cylinder supported by it has been reached, the pressure supporting the rest is cut, by means of the valve 38, and the actuator 25 is once again moved into the blocking position, by means of the valve 36; the valve 33 is therefore connected once again, providing feeding to the circuit 34 for lubrication of the sliding blocks.

Many other variants are possible within the scope of the invention with its general characteristics.

What is claimed is:

1. A motorized rest for supporting a workpiece on a bed of a grinding machine having means for rotating the workpiece around a longitudinal axis thereof, and means for displacing a grinding wheel parallel to said axis to grind a surface region of said workpiece while said workpiece is rotated, said motorized rest comprising:

a lower body mounted upon said bed;
   an upper body slidable on said lower body in a direction transverse to said axis;
   at least two blocks on said upper body slidably engaging a portion of said workpiece beyond said surface region;
   an eccentric shaft rotatable on said lower body about an axis perpendicular to said direction;
   a connecting pin on said upper body;
   a link extending generally in said direction and coupling said eccentric shaft with said pin to shift said upper body in said direction on rotation of said eccentric shaft;
   a servomotor on said lower body provided with a speed-reduction gear with a high reduction ratio connected with said eccentric shaft for rotating same;
   flexible means braced between said upper body and said lower body for compensation of play therebetween;
   lubricating means for lubrication mutually contacting sliding surfaces of said upper and lower bodies; and
   controllable clamping means coupling said upper and lower bodies for selectively clamping mutually juxtaposed surfaces thereof against one another to block shifting of said upper body.

2. The motorized rest defined in claim 1 wherein said flexible means includes a plurality of rods fixed to said upper body and passing through said lower body with clearance and respective coil springs braced between said rods and said lower body, said rods and said springs acting in a direction generally parallel to said direction in which said upper body is slidable transverse to said axis to maintain a stress upon said link, said eccentric shaft and said acting pin to eliminate play therebetween.

3. The motorized rest defined in claim 1 wherein said lubricating means includes means for hydrostatically supporting said upper body on said lower body.

4. The motorized rest defined in claim 1 wherein said controllable clamping means includes a hydromechanical actuator carried by said lower body and having a movable part engaging said upper body and having an operating axis perpendicular to said mutually juxtaposed surfaces.

5. The motorized rest defined in claim 1 wherein said upper body has a structure with vibrational characteristics differing from those of said lower body.

* * * * *